(12) United States Patent
Berkobin et al.

(10) Patent No.: US 10,002,466 B2
(45) Date of Patent: Jun. 19, 2018

(54) METHOD AND SYSTEM FOR PROVIDING AUTONOMOUS CAR ERRANDS

(71) Applicant: Verizon Patent and Licensing Inc., Arlington, VA (US)

(72) Inventors: Eric Berkobin, Atlanta, GA (US); Hamsa Ibrahim, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 789 days.

(21) Appl. No.: 14/595,305

(22) Filed: Jan. 13, 2015

(65) Prior Publication Data
US 2016/0203649 A1 Jul. 14, 2016

(51) Int. Cl.
| | |
|---|---|
| G07B 13/02 | (2006.01) |
| G01C 21/34 | (2006.01) |
| G05D 1/02 | (2006.01) |
| G06Q 20/38 | (2012.01) |
| G06Q 20/12 | (2012.01) |
| G06Q 20/40 | (2012.01) |
| G06Q 30/06 | (2012.01) |

(52) U.S. Cl.
CPC ......... *G07B 13/02* (2013.01); *G01C 21/3476* (2013.01); *G05D 1/0278* (2013.01); *G06Q 20/12* (2013.01); *G06Q 20/40* (2013.01); *G06Q 30/06* (2013.01); *G06Q 30/0609* (2013.01)

(58) Field of Classification Search
CPC .. G01C 21/3476; G05D 1/0278; G05D 20/12; G05D 20/40; G05D 30/06; G05D 30/0609; G07B 13/02
USPC ............................................................ 701/23
See application file for complete search history.

(56) References Cited

U.S. PATENT DOCUMENTS

| | | | |
|---|---|---|---|
| 6,292,569 B1 * | 9/2001 | Shear | G06F 21/10 380/251 |
| 6,459,967 B1 | 10/2002 | Otto | |
| 6,526,335 B1 | 2/2003 | Treyz et al. | |
| 6,958,707 B1 | 10/2005 | Siegel | |
| 7,449,995 B1 | 11/2008 | Clanton-Holloway | |
| 8,341,108 B2 | 12/2012 | Thompson et al. | |
| 8,422,481 B2 | 4/2013 | Hanuni et al. | |
| 8,874,365 B2 | 10/2014 | Moore et al. | |
| 9,245,396 B2 | 1/2016 | Delong et al. | |
| 9,418,554 B2 | 8/2016 | Velusamy | |
| 9,541,419 B2 | 1/2017 | Borghesani | |
| 2001/0029425 A1 | 10/2001 | Myr | |

(Continued)

*Primary Examiner* — Tyler J Lee

(57) ABSTRACT

A delivery server may generate two separate security codes following a transaction between a user and a vendor, as well as a hash of the combination of the codes. The server may provide the first code to the user and the second code to the vendor, and provide the hash of a combination of the codes to both the vendor and the user. The user's vehicle may receive mapping information for the vendor's location, and may use the mapping information to autonomously navigate to an exchange station at the vendor location. At the exchange station, the vendor and vehicle may exchange security codes, and both vehicle and vendor may create a hash of the combined first code and second code, and use this to authenticate each other (by comparing this hash with the hash received from the delivery server). The vendor may then provide the goods to the vehicle, and the vehicle may automatically receive them and return them to the user.

20 Claims, 5 Drawing Sheets

(56) References Cited

U.S. PATENT DOCUMENTS

| | | | |
|---|---|---|---|
| 2002/0044049 A1 | 4/2002 | Saito et al. | |
| 2002/0121989 A1 | 9/2002 | Burns | |
| 2002/0138354 A1* | 9/2002 | Seal | G06Q 30/06 705/50 |
| 2003/0135304 A1 | 7/2003 | Sroub et al. | |
| 2004/0095230 A1* | 5/2004 | Li | B67D 7/0401 340/426.16 |
| 2004/0128387 A1 | 7/2004 | Chin et al. | |
| 2005/0088318 A1 | 4/2005 | Liu et al. | |
| 2005/0165612 A1* | 7/2005 | Van Rysselberghe | A47G 29/141 705/26.1 |
| 2005/0262026 A1* | 11/2005 | Watkins | G06Q 20/02 705/67 |
| 2006/0069523 A1 | 3/2006 | Kanekawa et al. | |
| 2006/0176847 A1 | 8/2006 | Chen et al. | |
| 2007/0109111 A1 | 5/2007 | Breed et al. | |
| 2007/0265768 A1 | 11/2007 | Brown | |
| 2008/0161988 A1 | 7/2008 | Oesterling et al. | |
| 2008/0169345 A1* | 7/2008 | Keane | G06F 21/32 235/380 |
| 2009/0100003 A1 | 4/2009 | Lahtinen | |
| 2009/0112393 A1 | 4/2009 | Maten et al. | |
| 2009/0112470 A1 | 4/2009 | Wu et al. | |
| 2009/0179735 A1* | 7/2009 | Van Rysselberghe | A47G 29/141 340/5.73 |
| 2009/0210152 A1 | 8/2009 | Kawa | |
| 2010/0041378 A1 | 2/2010 | Aceves et al. | |
| 2010/0052945 A1 | 3/2010 | Breed | |
| 2010/0093383 A1 | 4/2010 | Kim | |
| 2010/0151838 A1 | 6/2010 | Wormald et al. | |
| 2010/0169009 A1 | 7/2010 | Breed et al. | |
| 2010/0289659 A1 | 11/2010 | Verbil | |
| 2010/0323661 A1 | 12/2010 | Himmelstein | |
| 2010/0332131 A1 | 12/2010 | Horvitz et al. | |
| 2011/0010446 A1 | 1/2011 | Chen et al. | |
| 2011/0052042 A1 | 3/2011 | Ben Tzvi | |
| 2011/0057774 A1* | 3/2011 | Van Rysselberghe | A47G 29/141 340/5.73 |
| 2011/0107084 A1 | 5/2011 | Hubner et al. | |
| 2011/0130134 A1* | 6/2011 | Van Rysselberghe | A47G 29/141 455/422.1 |
| 2011/0153459 A1 | 6/2011 | Kirian et al. | |
| 2011/0202466 A1* | 8/2011 | Carter | G06Q 20/20 705/67 |
| 2011/0307188 A1 | 12/2011 | Peng et al. | |
| 2012/0083995 A1 | 4/2012 | Vorona | |
| 2012/0296515 A1 | 11/2012 | Boss et al. | |
| 2013/0090133 A1 | 4/2013 | D' Jesus Bencci et al. | |
| 2013/0173208 A1 | 7/2013 | Kuzunishi et al. | |
| 2013/0210461 A1 | 8/2013 | Moldavsky et al. | |
| 2013/0211623 A1 | 8/2013 | Thompson et al. | |
| 2013/0218463 A1 | 8/2013 | Howard et al. | |
| 2013/0226443 A1 | 8/2013 | Scofield et al. | |
| 2013/0267255 A1 | 10/2013 | Liu et al. | |
| 2013/0325341 A1 | 12/2013 | Van Os et al. | |
| 2014/0040135 A1* | 2/2014 | Ovick | G06Q 20/3825 705/44 |
| 2014/0160295 A1 | 6/2014 | Kyomitsu et al. | |
| 2014/0200739 A1 | 7/2014 | Kirsch | |
| 2014/0279707 A1 | 9/2014 | Joshua et al. | |
| 2014/0375447 A1 | 12/2014 | Raghunathan et al. | |
| 2015/0019132 A1 | 1/2015 | Gusikin | |
| 2015/0183439 A1 | 7/2015 | Jackson | |
| 2015/0185030 A1 | 7/2015 | Monroe et al. | |
| 2015/0198459 A1 | 7/2015 | MacNeille et al. | |
| 2015/0239307 A1 | 8/2015 | Horikoshi et al. | |
| 2015/0268059 A1 | 9/2015 | Borghesani | |
| 2016/0042644 A1 | 2/2016 | Velusamy | |

* cited by examiner

METHOD AND SYSTEM FOR PROVIDING AUTONOMOUS CAR ERRANDS

CROSS-REFERENCE TO RELATED APPLICATIONS

The present application contains subject matter related to U.S. application Ser. No. 12/840,821, filed on Jul. 21, 2010, U.S. application Ser. No. 14/215,183, filed on Mar. 17, 2014, U.S. application Ser. No. 14/217,908, filed on Mar. 18, 2014, and U.S. application Ser. No. 14/453,721, filed on Aug. 7, 2014, the contents of which are incorporated by reference herein in their entirety.

BACKGROUND

Currently, when a customer and a vendor engage in an online transaction that includes a delivery or pickup component on the part of the customer, the customer must present some additional form of identification during the delivery or pickup to further authenticate the transaction. Additionally, the customer must generally drive to the vendor's location, and, upon arrival, must navigate to the correct area where the pick up or delivery may occur. These and other drawbacks exist.

BRIEF DESCRIPTION OF THE DRAWINGS

In order to facilitate a fuller understanding of the exemplary embodiments, reference is now made to the appended drawings, in which like reference characters are used to indicate like elements. These drawings should not be construed as limiting, but are intended to be exemplary only.

DETAILED DESCRIPTION OF EMBODIMENTS

Systems and methods are disclosed for facilitating a transaction and delivery using one or more autonomous vehicles. A user having a mobile device may perform an electronic transaction with the vendor. The transaction may include a delivery that the user must make to the vendor and/or an item that the user must pick up from the vendor. The user may provide a VIN for a vehicle that will be making the delivery. A delivery server may generate two separate security codes, as well as a hash of the combination of the codes. The server may provide the first code to the user and the second code to the vendor. Both the vendor and the user may receive the hash of the combined codes. The server may provide the vehicle's VIN to the vendor. The server may provide a location layout file to the user, where the location layout file includes information indicating the physical layout of the vendor's location. The server may provide the vendor's address and/or associated GPS coordinates to the user.

The vehicle may arrive at the vendor's location based on the vendor's address. The vehicle may navigate to a loading zone based on the layout file and one or more sensors on the vehicle. The vendor may request the vehicle's VIN to authenticate the vehicle. The vendor may provide the vehicle with the second code, and the vehicle may provide the vendor with the first code. The vehicle may create a hash of the combined first code and second code, and use this to authenticate the vendor (by comparing this hash with the hash received from the delivery server). The vendor may do the same. The vendor may then provide the goods to the vehicle, and the vehicle may automatically receive them and return them to the user.

The description below describes modules that may include one or more servers, databases, subsystems and other components. As used herein, the term "module" may be understood to refer to non-transitory executable software, firmware, processor or other hardware, and/or various combinations thereof. Modules, however, are not to be interpreted as software that is not implemented on hardware, firmware, or recorded on a tangible processor-readable or recordable storage medium (i.e., modules are not software per se). The modules are exemplary and may be combined, integrated, separated, and/or duplicated to support various applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

Figure 1:
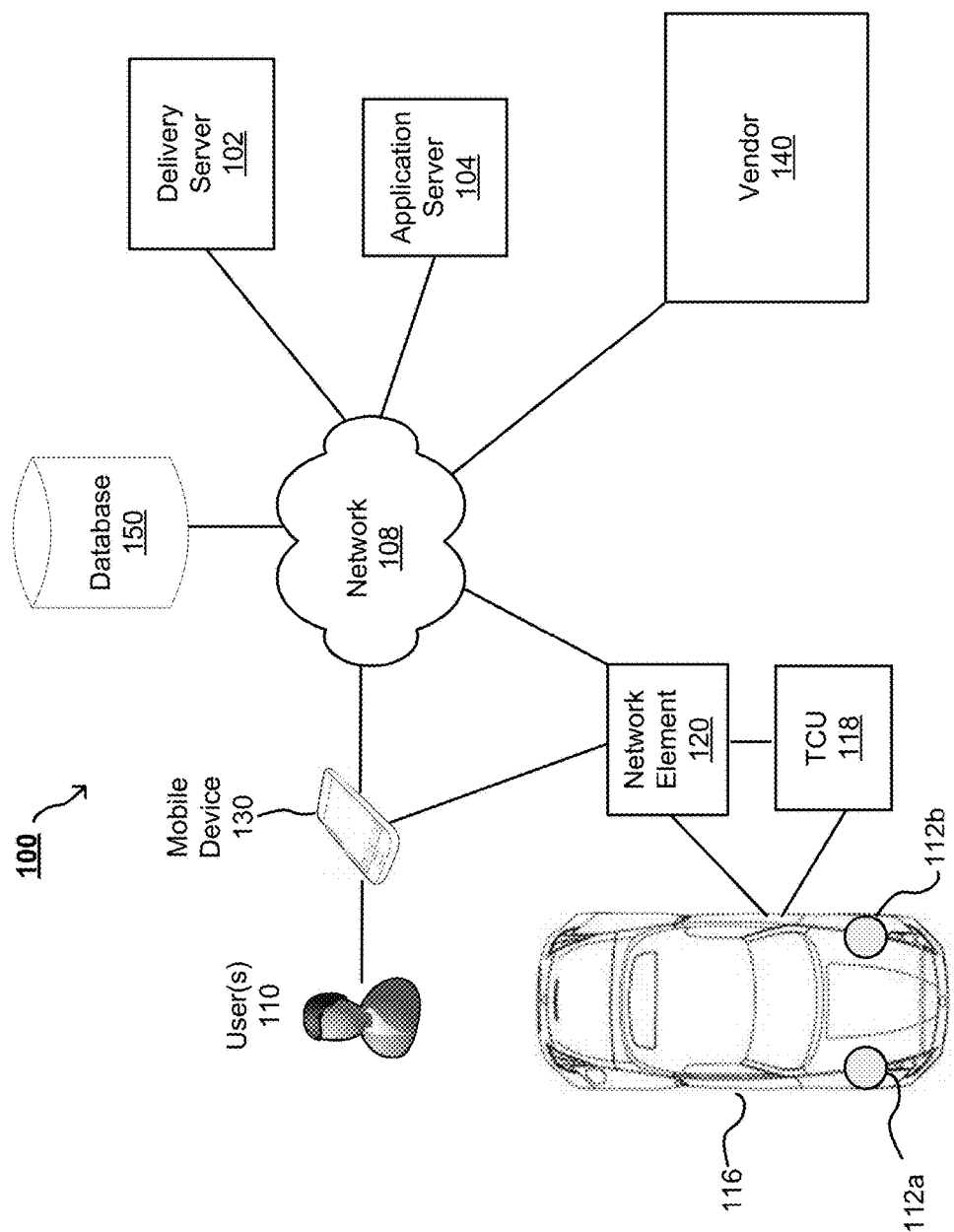
FIG. 1 depicts a block diagram of a system architecture for facilitating a transaction and delivery using one or more autonomous vehicles, according to an example embodiment.

Referring to FIG. 1, a schematic diagram of a system 100 for providing autonomous vehicle errands is shown, according to an exemplary embodiment. As illustrated, network 108 may be communicatively coupled with one or more data transmitting devices or entities, user devices, and network elements. It should be appreciated that the system 100 of FIG. 1 may be implemented in a variety of ways. Architecture within system 100 may be implemented as a hardware component (e.g., as a module) within a network element or network box. It should also be appreciated that architecture within system 100 may be implemented in computer executable software (e.g., on a tangible computer-readable medium). Module functionality of architecture within system 100 may be located on a single device or distributed across a plurality of devices including one or more centralized servers and one or more mobile units or end user devices.

Network 108 may be a wireless network, a wired network or any combination of wireless network and wired network. For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. In addition, network 108 may include, without limitation, telephone line, fiber optics, IEEE Ethernet 802.3, a wide area network ("WAN"), a local area network ("LAN"), or a global network such as the Internet. Also, network 108 may support, an Internet network, a wireless communication network, a cellular network, Bluetooth, or the like, or any combination thereof. In various embodiments, network 108 may be a 4G network that complies with the International Mobile Telecommunications Advanced (IMT-Advanced) specification. Network 108 may be a Long Term Evolution (LTE) network. Network 108 may be a LTE Advanced (LTE-A) network. Network 108 may be a Mobile WiMAX (IEEE 802.16e). Network 108 may be a Mobile WiMAX Release 2 (IEEE 802.16m) network.

Network 108 may further include one, or any number of the exemplary types of networks mentioned above operating as a stand-alone network or in cooperation with each other. Network 108 may utilize one or more protocols of one or more network elements to which it is communicatively coupled. Network 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cellular network, corporate networks, municipal networks, government networks, or home networks.

Mobile device 130 may be a mobile communications device, a smartphone, a tablet computer, a wearable computer such as in the form of a wrist watch, bracelet, or glasses, a home phone, a cellular phone, a mobile phone, a satellite phone, a personal digital assistant, a computer, a handheld multimedia device, a personal media player, a gaming device, a mobile television, or other devices capable of displaying alerts and communicating with network element 120, directly with network 108 or via one or more transceivers (not shown). Mobile device 130, network element 120, and/or TCU 118 may connect to network 108 and communicate with other network elements, servers or providers using WiFi, 3G, 4G, Bluetooth, or other chipsets. Mobile device 130 may receive sensor data from vehicle 116 and/or TCU 118, and transmit data to delivery server 102.

Network element 120 may include one or more processors (not shown) for recording, transmitting, receiving, or storing data. Network element 120 may transmit and receive data to and from network 108. The data may be transmitted and received utilizing a standard telecommunications protocol or a standard networking protocol. For example, one embodiment may utilize text messages and/or a Short Message Service "SMS." In other embodiments, the data may be transmitted or received utilizing Session Initiation Protocol ("SIP"), Voice Over IP ("VoIP"), or other messaging protocols. Data may also be transmitted or received using Wireless Application Protocol ("WAP"), Multimedia Messaging Service ("MMS"), Enhanced Messaging Service ("EMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection. A number of different types of signals or alerts may be transmitted via network 108 including, but not limited to, alerts indicative of information content, such as a text message, a voice message (including computer generated voice messages), an email, an alert, a prompt, a notification, a banner, a pop-up, a video signal, a link, a vibration pattern, a visual light signal, a ring tone, or any combination of the foregoing.

Application server 104 may provide an application to a computing device such as mobile device 130, for example. Via an application installed on the mobile device 130, the user may establish various user settings, including privacy and tracking settings. The application may be, or may be linked to, a third-party application, such as a maps application. Also, the application may be a social media add-on such that it operates in conjunction with a social media application, but may nevertheless be maintained by an entity other than the social media entity.

User settings may be established by the user within the application, or using an associated website on the Internet, and may be stored on the computing device (e.g., mobile device 130), on application server 104, in database 150, or in user profile module 204. The user settings and may be retrieved by input module 202 and used by vendor profile module 206, security module 208, and/or mapping module 210 when performing the various operations described herein.

User(s) 110 may be a user of a computing device, a person or computing device that receives an alert, or a driver of vehicle 116, for example. User(s) 110 may be singular or plural. Vendor 140 may be an individual or entity that provides goods and/or services to other individuals and/or entities. Vendor 140 may comprise one or more network-enabled computers communicatively coupled to network 108. In various embodiments, user 110 may be another business entity, similar to vendor 140. For example, user 110 may be a manufacturer and vendor 140 may be a distributor. User 110 may own a plurality of vehicles (such as vehicle 116) and dispatch one vehicle to make a delivery to vendor 140 and/or pickup goods from vendor 140 following an electronic transaction.

Vehicle 116 may include one or more display devices, which may be a touchscreen device or a dashboard display, including a plasma display panel (PDP), liquid crystal display (LCD), thin film transistor (TFTLCD), super LCD, light emitting diode (LED), organic LED (OLED), active matrix OLED (AMOLED), LED-backlit LCD, super AMO-LED, a retina display, or a heads-up-display (HUD). Vehicle 116 may include one or more sensors 112a and 112b. Sensors 112a and 112b may be devices for detecting low-energy transmissions from nearby beacons. Devices 112a and 112b may be LED, RFID, near-field communications (NFC), infrared, and/or Bluetooth-enabled. Sensors 112a and 112b may be communicatively coupled to TCU 118, network element 120, and/or mobile device 130. The location of each of sensors 112a and 112b on vehicle 116 may be known by TCU 118, network element 120, and/or mobile device 130. The location of each of sensors 112a and 112b may be standardized on vehicle 116, based on the type of vehicle (e.g., pickup truck, sedan, 4-door v. 2-door, compact, mid-size, SUV).

Telematics control unit (TCU) 118 in FIG. 1 may include one or more devices that monitor parameters of vehicle 116. TCU 118 also may include sensors, such as, for example, accelerometers, cameras, speakers or microphone, or connections for same. In addition, a user's mobile device 130 may include sensors and may supplant some, or all, of the features and functionality of TCU 118 that a vehicle's manufacture installed at the factory, or that may be performed by an aftermarket telematics device that couples to a diagnostic port of a vehicle. In various embodiments, TCU 118 may provide substantially all of the data relating to the vehicle and its location, motion, or acceleration. TCU 118 may collect large amounts of data regarding the vehicle 116 to which it is attached, including: location (GPS, GLONASS), engine status, speed, stops, starts, temperature, acceleration values, nearby Wi-Fi signals, accelerometer data, brake applications, gyroscope sensor information, height information from an altimeter, visual information from a camera communicatively coupled to the TCU device, audio from a microphone, or revolutions per minute (RPM) of the vehicle's engine, for example. Data may be gathered from multiple TCU devices on multiple vehicles, and it should be appreciated that "TCU device" may refer to "one or more TCU devices." Such data may be gathered anonymously. The data may be gathered in response to a command from user 110. The data may be automatically gathered at regular intervals. The data may be gathered based on remote signals received from delivery server 102. TCU 118 may include a number of sensors including an accelerometer, barometer, altimeter, and gyroscope, for example. Sensors within mobile device 130 may similarly include an accelerometer, gyroscope, or GPS sensor, for example.

Exemplary data that may be captured by TCU 118 over a period of time includes location (e.g., latitude, longitude and/or altitude), heading (e.g., degrees), weather conditions (e.g., degrees, precipitation), whether the window wipers are on/off, vehicle speed, vehicle status, whether the headlights are on/off, application of brakes, wheel slippage, skidding, sliding, rate of acceleration (measured in g's in the x, y, z directions, for example), pressure values (e.g., kPa), altitude, grade (rate of incline/decline), forces at wheels, use of the vehicle's horn, damping forces, fuel consumption, etc.

Data may include unique information identifying user 110. User 110 may create a user profile with application server 104 and access his profile using an application on mobile device 130, provided by application server 104. The profile information may include the user's name, address, phone number, email address(es), a username and password, driver's license number, license plate number, VIN number for vehicle 116, the make and model of vehicle 116, and other identifying information. The user may use the application to associate mobile device 130, vehicle 116, and/or TCU 118 with his profile. Delivery server 102 may communicate with application server 104 to receive the profile information. The profile information may be received by user profile module 204 and stored in database 150. Sensor data may be transmitted from sensors 118 to mobile device 130. Mobile device 130 may transmit the data to delivery server 102.

Figure 2:
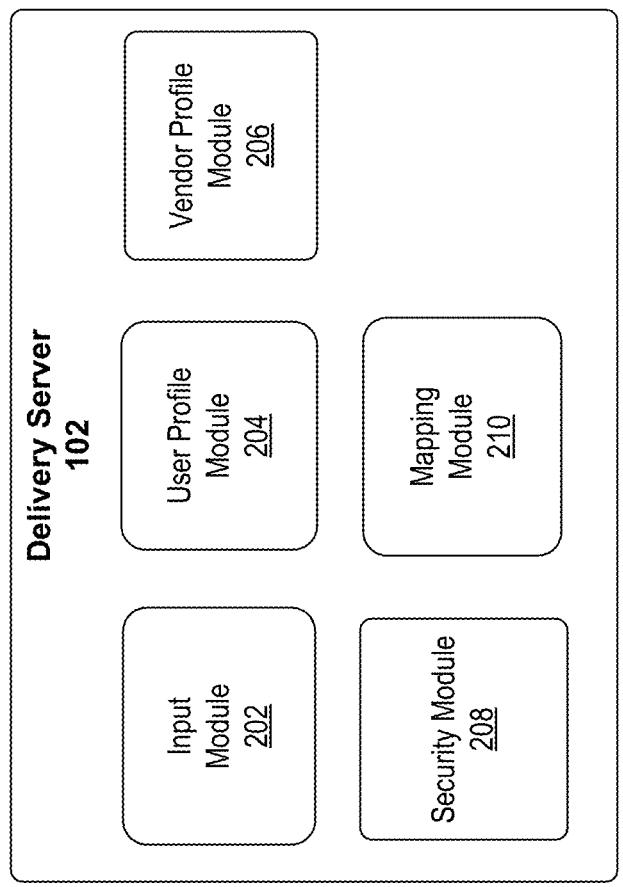
FIG. 2 depicts a block diagram of a hardware module for facilitating a transaction and delivery using one or more autonomous vehicles, according to an example embodiment of the invention.

Delivery server 102 may include an input module, a user profile module, a vendor profile module, a security module, and a mapping module, as described herein in reference to FIG. 2. In various embodiments, delivery server 102 may be a resolution server or may be a module of, or communicatively coupled to, a Domain Name System ("DNS") server, such as a BIND server, for converting host names and domain names into IP addresses over the Internet. Delivery server 102 may comprise one or more network enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. In other embodiments, the operations performed by delivery server 102 may be implemented as part of an application on mobile device 130, network element 120, and/or at TCU 118 of vehicle 116. It is noted that the modules 202, 204, 206, 208, and 210 are exemplary and the functions performed by one or more of the modules may be combined with that performed by other modules. The functions described herein as being performed by the modules 202, 204, 206, 208, and 210 also may be separated and may be located or performed by other modules. Moreover, the modules 202, 204, 206, 208, and 210 may be implemented at other devices of the system 100 (e.g., mobile device 130, TCU 118, and/or network element 120).

Input module 202 may be a network element that receives information from mobile device 130, TCU 118, network element 120, and/or vendor 140 via network 108. Input module 202 may provide the received information to user profile module 204, vendor profile module 206, security module 208, and/or mapping module 210. Input module 202 may provide information to mobile device 130, TCU 118, network element 120, and/or vendor 140 via network 108.

User profile module 204 may store and/or maintain one or more profiles associated with user 110. The user profile information may include the user's name, address, phone number, payment information (e.g., account numbers, routing numbers), email address(es), a username and password, driver's license number, license plate number for vehicle 116, VIN number for vehicle 116, the make and model of vehicle 116, and other identifying information. User 110 may have provided this user profile information via mobile device 130. The user profile information may be received by user profile module 204 and stored in database 150.

Vendor profile module 206 may store and/or maintain one or more profiles associated with vendor 140. The vendor profile information may include, for example and without limitation, the vendor's name, address, phone number(s), payment information (e.g., account numbers, routing numbers), email address(es), usernames and passwords, and logos. Vendor 140 may have provided this vendor profile information via network 108. The vendor profile information may be received from one or more third-party sources (not shown). The vendor profile information may be received by vendor profile module 206 and stored in database 150.

User 110 may conduct a transaction with vendor 140 over network 108. The transaction may be conducted by delivery server 102. The transaction may be conducted by a third party. The transaction may include a component where user 110 must pick up or deliver an item to vendor 140. For example, user 110 may access a web portal interface provided by input module 202. The web interface may facilitate transactions between user 110 and vendor 140. User 110 may order goods or services from vendor 140, and pay for them using the web interface. Input module 202 may receive one or more signals indicating that the transaction has been completed. Delivery server 102 may facilitate the online transaction using the user profile information and vendor profile information from user profile module 204 and vendor profile module 206, respectively. In response, security module 208 may generate a unique transaction code. The transaction code may comprise a first portion and a second portion. The first portion and/or second portion may be generated based on at least some of the information in the user profile information for user 110 (e.g., the user's name, address, phone number, vehicle 116's VIN number) and/or the vendor profile information for vendor 140 (e.g., the vendor's name, address, phone number, logos). Security profile module 208 may randomly generate the first portion and/or the second portion. Security profile module 208 may generate a hash of the transaction code (i.e., the first portion+the second portion).

Input module 202 may provide the first portion of the transaction code and the hash of the transaction code to mobile device 130, network element 120, and/or TCU 118 via network 108. Input module 202 may provide the second portion of the transaction code and the hash of the transaction code to vendor 140 via network 108. Input module 202 may provide the address of vendor 140 to mobile device 130, network element 120, and/or TCU 118 (based on the address stored by vendor profile module 206) via network 108. The address may be in the form of geographical coordinates (e.g., GPS coordinates). The address may be a street address for the location of vendor 140. Input module 202 may provide the VIN number for vehicle 116 to vendor 140 via network 108. In various embodiments, input module 202 may provide vendor 140 with an estimated pick-up/drop-off time. This may be based on information provided by user 110 via mobile device 130. This may be based on the current distance between vehicle 116 and vendor 140.

Mobile device 130, network element 120, and/or TCU 118 may compute a route from vehicle 116 to vendor 140, based on the vendor address received from input module 202. The route may be based on the current location of vehicle 116 relative to vendor 140. The route may be based on the date and time. The route may be based on the current weather and traffic conditions. The route may be computed by mapping module 210 based on input module 202 receiving the current location of vehicle 116. Mapping module 210 may have access to one or more mapping databases (not shown). Mobile device 130, network element 120, and/or TCU 118 may determine the estimated time of travel for vehicle 116 to reach vendor 140. This estimated time of travel may be provided to input module 202.

Input module 202 may provide vendor mapping information for vendor 140 to mobile device 130, network element 120, and/or TCU 118 via network 108. The mapping information may be retrieved by mapping module 210. The vendor mapping information will be described below in reference to FIG. 3.

Figure 3:
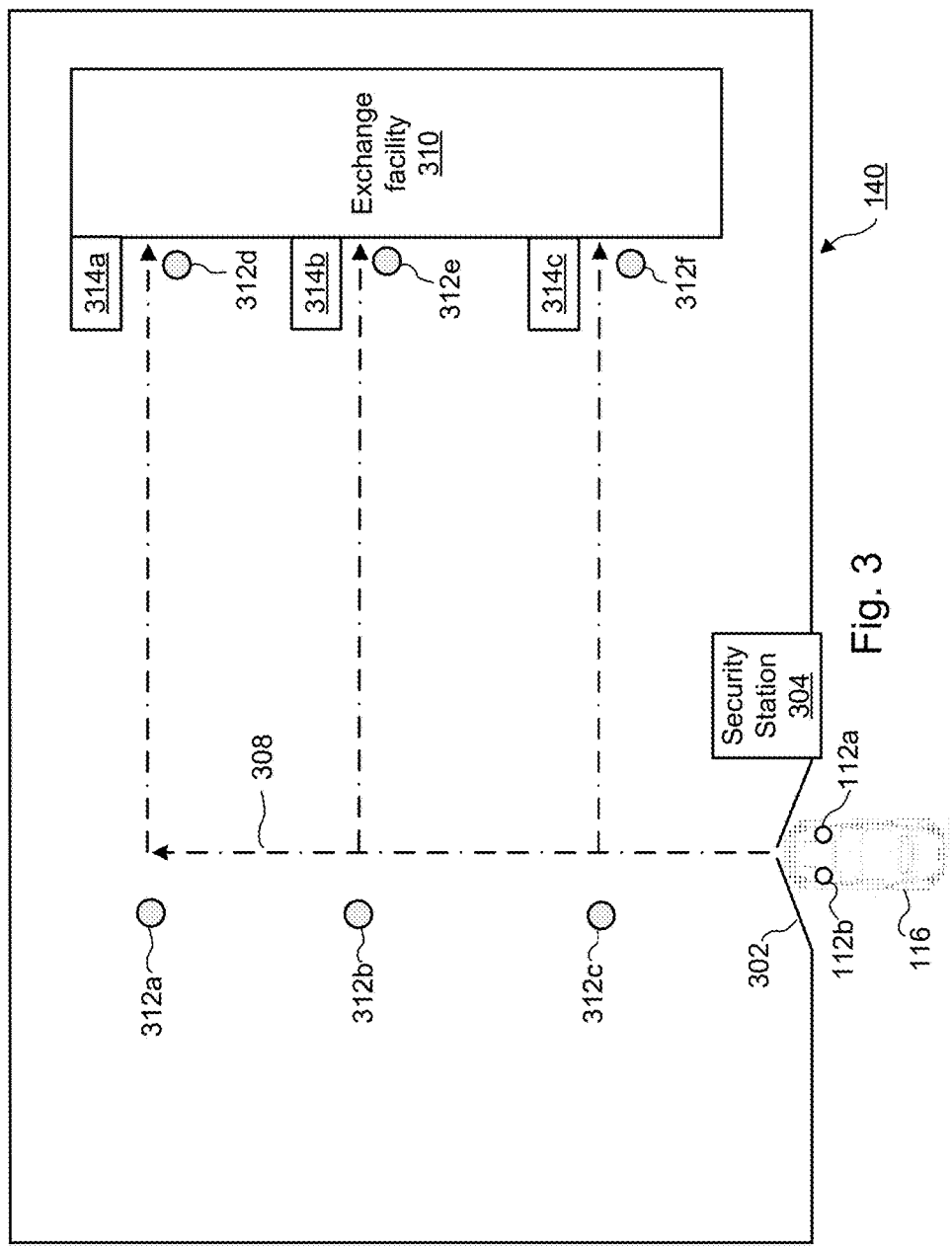
FIG. 3 depicts a block diagram of a system architecture for facilitating a transaction and delivery using one or more autonomous vehicles, according to an example embodiment.

Vehicle 116 may drive to vendor 140 based on the computed route. User 110 may use mobile device 130, TCU 118, and/or network element 120 to instruct vehicle 116 to drive to vendor 140. Vehicle 116 may be carrying the goods that are to be delivered to vendor 140 and/or may have a storage compartment for receiving goods from vendor 140. Vehicle 116 may arrive at vendor 140. FIG. 3 shows a diagram of a vendor 140, according to an example embodiment. As shown in FIG. 3, vendor 140 may comprise a security apparatus 302, a security station 304, guidance segment 308, exchange facility 310, beacons 312a-312f, and exchange stations 314a-314c.

Security apparatus 302 may be a moveable gate or arm that prevents entry to vendor 140. Security station 304 may include one or more sensors for detecting the presence of vehicle 116 when it arrives. Upon arriving at security station 304, vehicle 116 may transmit an identifier to security station 304 over a short range, wireless medium. The identifier may be vehicle 116's VIN. Security station 304 may include one or more network-enabled computers that previously received the VIN number from input module 202 (as described above). If security station 304 matches the VIN number received directly from vehicle 116 with the VIN number that it previously received, security station 304 may allow vehicle 116 to enter the premises (e.g., by opening gate 302 and/or lifting a mechanical arm 302). In other embodiments, security station 304 may be placed at any one of exchange stations 314a-314c, and the verification process may take place when vehicle 116 arrives at exchange stations 314a-314c.

Vendor mapping information for vendor 140 may include information about beacons 312a-312f, guidance segment 308, exchange facility 310, and exchange stations 314a-314f. Each of beacons 312a-312f may transmit a unique identifier. Beacons 312a-312f may be Bluetooth-enabled to transmit the unique identifier. Beacons 312a-312f may use Bluetooth Low Energy (Bluetooth LE or Bluetooth Smart) technology. Beacons 312a-312f may be iBeacons. The vendor mapping information may include the unique identifier transmitted from each of beacons 312a-312f. The vendor mapping information may include location data for each of beacons 312a-312f. Location data may include the location of each of beacons 312a-312f relative to one another, security station 304, guidance segment 308, exchange facility 310, and/or exchange stations 314a-314c. Exchange stations 314a-314c may also include transceivers similar to beacons 312a-312f. Vendor mapping information may include location data for exchange facility 310 and/or exchange stations 314a-314c.

The vendor mapping information may include instructions for TCU 118, mobile device 130, and/or network element 120 to guide vehicle 116 to the appropriate exchange station. In various embodiments, each exchange station may have unique dimensions to accommodate vehicles of a certain weight, size, type, class, etc. For example, exchange station 314a may be for pickup trucks, exchange station 314b may be for sedans, and exchange station 314c may be for mid-size or smaller vehicles. The vendor mapping information provided by mapping module 210 may be modified based on the size, weight, type, class, etc. of vehicle 116 (e.g., if vehicle 116 is a 4-door sedan, the vendor mapping information may include instructions for vehicle 116 to drive to exchange station 314b when it arrives at vendor 140's location). Mapping module 210 may modify the vendor mapping information based on the user profile information from user profile module 204 and/or the vendor profile information in vendor profile module 206. The vendor mapping information may include the specific guidance segments 308 that vehicle 116 should follow. Vendor mapping information may include the unique identifiers of the beacons 312a-312f that vehicle 116 should follow in order to arrive at the correct exchange station.

As vehicle 116 enters vendor 140's facility, sensors 112a and 112b in (vehicle 116) may detect signals transmitted by each of beacons 312a-312f when vehicle 116. TCU 118 may determine the position of vehicle 116 relative to each of beacons 312a-312f based on the relative strength of the signal received by sensor 112a when compared to the signal received by sensor 112b (and/or the timing of the signal being detected at sensor 112a versus sensor 112b). TCU 118 may compare the unique identifiers received by each of beacons 312a-312f with the unique identifiers in the vendor mapping information for vendor 140. TCU 118 may determine the position of vehicle 116 relative to each of beacons 312a-312f based on matching unique identifiers. TCU 118, mobile device 130, network element 120, and/or user 110 may guide vehicle 116 based on the instructions in the vendor mapping information and the signals received by beacons 312a-312f, the guidance segments 308, and/or exchange stations 314a-314c.

Guide segment 308 may comprise one or more infrared sensors and/or markers on the driving surface at vendor 140. Guidance segments 308 can help guide vehicle 116 to exchange stations 314a-314c. Sensors 112a and 112b may detect guide segment 308 when vehicle 116 drives over guide segment 308. TCU 118, mobile device 130, network element 120, and/or user 110 may automatically guide vehicle 116 along guide segment 308 to one or more of exchange stations 314a-314c. In various embodiments, vehicle 116 may be equipped with one or more cameras that can detect the location and/or presence of guide segments 308 and this can be used by vehicle 116, TCU 118, mobile device 130, and/or network element 120 to guide vehicle 116. Mobile device 130, TCU 118, and/or network element 120 may provide step-by-step instructions at a display in vehicle 116 for user 110 (or another driver of vehicle 116) to follow (e.g., "(1) follow the red line for 100 feet; (2) turn right now").

TCU 118 may automatically guide vehicle 116 to one of exchange stations 314a-314c based on the signals received from beacons 312a-312f and/or guide segment 308. The vendor mapping information may identify the specific exchange station where vehicle 116 should drive to. Vehicle 116 may drive to exchange station 314a based on signals received from beacons 312a-312f, guide segment 308, and/or exchange stations 314a-314c (using the vendor mapping information). When vehicle 116 is parked at exchange station 314a, exchange station 314a and/or exchange facility 310 may detect the presence of vehicle 116.

When exchange station 314a and/or facility 310 detects the presence of vehicle 116 being parked in the proper location to receive/deliver the goods, exchange facility 310 and/or exchange station 314a may transmit a request to vehicle 116 for the first portion of the transaction code (the portion received by the vehicle 116 when the transaction was first performed). Vehicle 116 may transmit a request to exchange facility 310 and/or exchange station 314a for the second portion of the transaction code (the portion received by vendor 140 when the transaction was first performed). Upon each receiving the respective portion of the transaction code from the other, vehicle 116 may combine the first portion of the transaction code with the now-received second portion perform a hash of the combined value, and compare this with the hash originally received from security module 208. If the two hashes match, vehicle 116 may proceed with the delivery/pickup of the goods. Exchange station 314a and/or exchange facility 310 may perform the same process independently. In this way, both vehicle 116 and exchange facility 310 independently verify the transaction.

If the vehicle 116 verifies the transaction, vehicle 116 may automatically open a receiving compartment to receive the goods from exchange station 314a and/or deliver the goods to exchange station 314a. Likewise, if exchange station 314a and/or exchange facility 310 verifies the transaction (as described above), exchange station 314a may provide the goods to the receiving compartment of vehicle 116 (e.g., using a mechanical means) or receive the goods from vehicle 116. Vehicle 116 may then leave vendor 140 and return to user 110. In various embodiments, vehicle 116 will not release the goods until TCU 118, network element 120, and/or mobile device 130 detect that vehicle 116 is within a minimum distance of the exchange facility (based on signals received from beacons, GPS, guidance segments, etc).

In one example, a user having mobile device 130 conducts an online transaction with a dry-cleaning vendor. The user pays for the dry-cleaning online, and provides a date and time (e.g., 8/14/2014 @ 2:00 PM) when the user's vehicle will drop off the dry cleaning at the dry-cleaning vendor's location. Vendor profile module 206 provides the drycleaner's address (1000 Washington Lane, Richmond, Va. 23219) to mobile device 130 and/or the user's vehicle (vehicle 116, via network element 120 and/or TCU 118). Mapping module 210 provides vendor mapping information for the drycleaner's location to mobile device 130 and/or vehicle 116. The drycleaner receives the estimated date and time of the drop off. User profile module 204 provides vehicle 116's VIN to the drycleaner.

Security module 208 creates two keys (e.g., key_A and key_B). Key_A and/or Key_B could be based on randomly generated numbers. Key_A and/or Key_B could be based on the user's address, the vendor's address, the VIN, transaction information, or other information. Security module 208 creates a hash of a combination of key_A and key_B: Hash(Key_A+Key_B). The hash may be a one-way hash function that is provided to mobile device 130, TCU 118, network element 120, vehicle 116 and the drycleaner. Security module 208 may provide Key_A and Hash(Key_A+Key_B) to mobile device 130, TCU 118, network element 120, and/or vehicle 116. Security module 208 may provide Key_B and Hash(Key_A+Key_B) to the drycleaner.

In various embodiments, security module 208 may create a third key. The third key may be based on the location coordinates associated with the vehicle 116 at the time of the transaction. Mobile device 130 may receive GPS coordinates from TCU 118 and provide them to interface module 202 (and/or mobile device 130 may provide its own GPS coordinates to interface module 202). Security module 208 may create a third key by encrypting and/or hashing the GPS coordinates received from mobile device 130. TCU 118 may store the coordinates at this time as well.

Vehicle 116 may drive to the address provided for the drycleaner's location (1000 Washington Lane, Richmond, Va. 23219). Vehicle 116 may navigate there using a GPS-system (e.g., part of TCU 118). Mobile device 130 may navigate to the address and communicate directions to vehicle 116. When vehicle 116 arrives at the drycleaner's location, the vendor may wirelessly request (e.g., using Bluetooth signals) some sort of identification from vehicle 116. Vehicle 116 may provide its VIN to the vendor, and may be permitted to proceed once the vendor has authenticated the VIN. In various embodiments, vehicle 116 may also provide the location coordinates stored at TCU 118 (associated with the vehicle's location at the time of the transaction, as described above) to the vendor over the short-range wireless frequency (e.g., Bluetooth). Vendor may receive the third key from security module 208 and receive the hash function and perform a hash of the coordinates from vehicle 116, and then compare this value to the third key (as an additional layer of authentication). If there is a match, vehicle 116 may be permitted to proceed.

Vehicle 116 may use the vendor mapping information associated with the drycleaner's location to navigate to a specific area where the delivery will occur. The drycleaner's location may include multiple beacons (such as beacons 312a-312f) and/or guidance segments (such as guidance segment 308) located throughout the premises. The location and transmission information for these beacons/guidance segments may be included in the vendor mapping information stored with vehicle 116. The vendor mapping information may include specific instructions and/or directions for vehicle 116 to follow when it arrives at the drycleaner's location. Upon being granted access to the drycleaner's location, vehicle 116 may use the vendor mapping information to navigate to the specific delivery area by detecting the locations of the beacons/guidance segments using built in sensors on vehicle 116 (e.g., sensors 112a and 112b). Mobile device 130 may also detect beacons 312a-312f and/or guidance segments 308 and provide navigation instructions to vehicle 116.

Once vehicle 116 is parked at the delivery area, vehicle 116 and/or mobile device 130 may transmit key_A to the drycleaner (using a short-range transmission medium, such as Bluetooth). The drycleaner may also transmit key_B to vehicle 116 and/or mobile device 130. Vehicle 116 and/or mobile device 130 may combine key_A and key_B and perform a hash of the combination. Vehicle 116 and/or mobile device 130 may then compare this hash with the hash received following the initial transaction (Hash(Key_A+ Key_B). If the hashes match, vehicle 116 may proceed with the delivery (e.g., by automatically opening a door on vehicle 116 next to where the dry-cleaning is located in vehicle 116). Similarly, the drycleaner may combine Key_A and Key_B and perform a hash of the combination. The drycleaner may then compare this hash with the hash received following the initial transaction (Hash(Key_A+ Key_B). If the hashes match, the drycleaner may automatically retrieve the dry-cleaning from vehicle 116 (e.g., using a mechanical arm). In various embodiments, the drycleaner may compare the current date and time to the delivery date and time received at the time of the transaction. If the difference between the two is greater than a certain predetermined time (e.g., 1 hour), the drycleaner may refuse to authenticate the vehicle 116 and/or receive the dry cleaning. For example, if vehicle 116 arrives much earlier or later than it originally estimated, the drycleaner may not allow vehicle 116 to enter the premises.

In various embodiments, vendor 140 may be mobile (e.g., a delivery truck). Vendor 140 may drive to an area and park. Vendor 140 may include one or more beacons that broadcast unique signals. This information may be provided to vehicle 116 in vendor mapping information, and vehicle 116 may drive to the location of vendor 140. In this embodiment, vendor 140 may be associated with a mobile device. The vendor's mobile device may exchange authentication information with mobile device 130. In various embodiments, the process may be reversed (e.g., vendor 140 may deliver goods or services to user 110). In various embodiments, once a delivery has occurred, user 110 and/or vendor 140 may receive a confirmation (e.g., a notification at mobile device 130). Vendor 140 may provide a confirmation to interface module 202 that vendor 140 delivered and/or received the goods from vehicle 116, and interface module 202 may transmit a confirmation to mobile device 130. The process may work in reverse as well.

Figure 4:
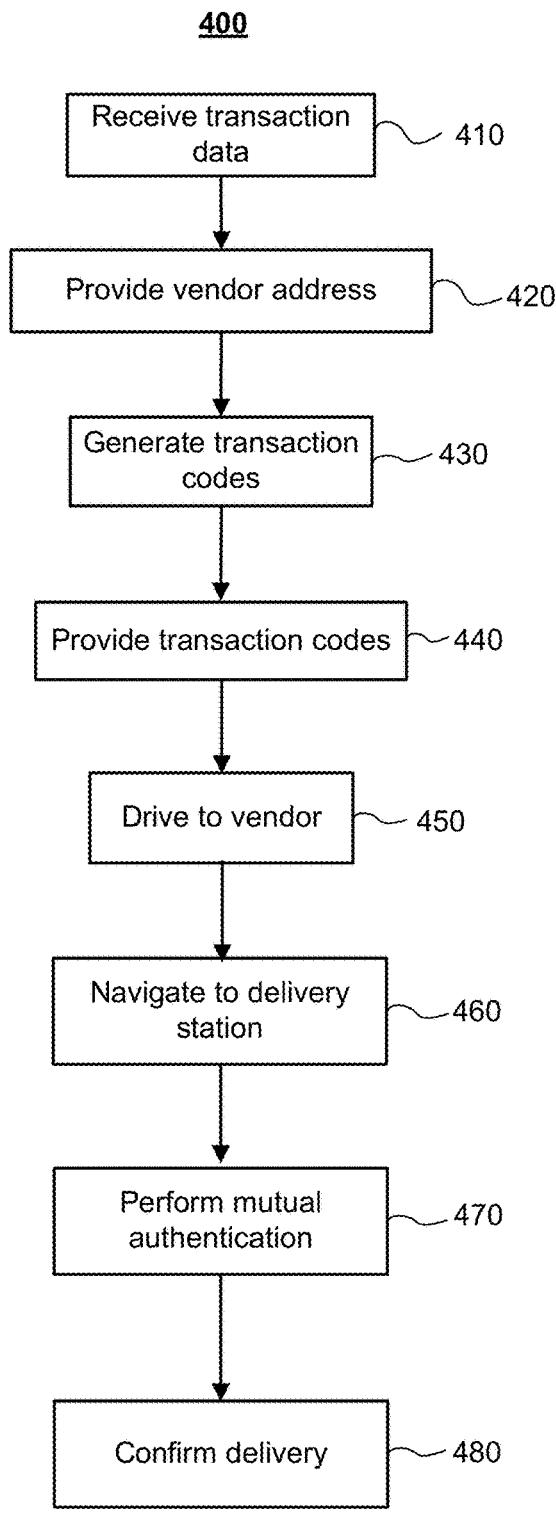
FIG. 4 depicts an illustrative flowchart of a method for facilitating a transaction and delivery using one or more autonomous vehicles, according to an exemplary embodiment.

Referring to FIG. 4, an illustrative flowchart of a method for facilitating a transaction and delivery using one or more autonomous vehicles. This exemplary method 400 is provided by way of example, as there are a variety of ways to carry out methods according to the present disclosure. The method 400 shown in FIG. 4 can be executed or otherwise performed by one or a combination of various systems and modules. The method 400 described below may be carried out by system 100 shown in FIG. 1 and delivery server 102 shown in FIG. 2, by way of example, and various elements of the system 100 and delivery server 102 are referenced in explaining the exemplary method of FIG. 4. Each block shown in FIG. 4 represents one or more processes, decisions, methods or subroutines carried out in exemplary method 400, and these processes, decisions, methods or subroutines are not necessarily carried out in the specific order outlined in FIG. 4, nor are each of them required. Referring to FIG. 4, exemplary method 400 may begin at block 410.

At block 410, input module 202 of delivery server 102 may receive transaction data from user 110 (e.g., via mobile device 130) and vendor 140. In one example, user 110 may previously dropped off motor at a mechanic for repairs. The mechanic may send a notification to the user indicating that the motor is ready to be picked up from the mechanic's location. The user may access a web portal provided by interface module 202 and schedule a time to pick up the motor. The user may schedule the motor for pickup at 2:00 PM on Sep. 30, 2014. The user may submit payment at that time using interface module 202. The transaction data may include one or more account numbers associated with a payment account. The transaction data may include the date and time for the scheduled pickup. The transaction data may include a VIN or license plate number for the user's vehicle. In this example, the user's vehicle may be a Toyota 4-Runner. Method 400 may proceed to block 420.

At block 420, mapping module 210 may provide the vendor's address to the user. In this example, mapping module 210 and/or interface module 202 may provide the mechanic's address to the user's mobile device and/or an onboard computer on the user's vehicle. Mapping module 210 may provide vendor mapping information to the user (e.g., at mobile device 130, network element 120, and/or TCU 118). The vendor mapping information may include layout information for the mechanic and specific instructions for where vehicle 116 should go once it reaches the mechanic's location. At block 430, security module 208 may generate transaction codes. The transaction codes may comprise a first code and a second code. In this example, the first code may be code_1, and the second code may be code_2. At block 440, interface module 202 may provide code_1 to the user and code_2 to the mechanic. The user may receive code_1 at his mobile device and/or at the onboard computer for his Toyota 4-Runner. Security module 208 may also generate a hash of the combination of code_1 and code_2, and provide this hash to both the user and the mechanic. Security module 208 may also provide the hash function to both the user and the mechanic. Method 400 may proceed to block 450.

At block 450, the user's vehicle may be driven to the vendor's location, using the received address. The vehicle may navigate based on turn-by-turn directions provided by mobile device 130, TCU 118, and/or network element 120. Vehicle 116 may navigate automatically (e.g., vehicle 116 may be a self-driven car). User 110 may drive vehicle 116 to the mechanic. At block 460, vehicle 116 may arrive at the mechanic and navigate to an exchange station at the vendor. Vehicle 116 may navigate to the correct exchange station based on the vendor mapping information provided by mapping module 210. The vendor mapping information may have been created based in part on the type of vehicle. In this case, because vehicle 116 is a Toyota 4-Runner (a pickup truck), the vendor mapping information may direct the vehicle to a specific exchange station that is dimensioned for pickup trucks.

The vendor mapping information may include a layout of the mechanic's facility. The mechanic's facility may include four beacons—beacon A, beacon B, beacon C, and beacon D. Each beacon may broadcast a unique identifier via a Bluetooth Low Energy signal. The vendor mapping information may include the unique identifier transmitted from each of beacons A-D. The vendor mapping information may include location data for each of beacons A-D relative to the exchange stations. The vendor mapping information may include instructions for the user's vehicle to drive to exchange station 1, which is dimensioned for pickup trucks. Exchange station 1 may also include transceivers similar to beacons A-D.

The user's 4-Runner may be equipped with sensors for detecting the signals from beacons A-D and relaying this information to TCU 118, mobile device 130, and/or network element 120. TCU 118, mobile device 130, and/or network element 120 may provide turn by turn directions to a display in the 4-Runner that a user can follow, based on the signals received from each of beacons A-D. The 4-Runner may be autonomously driven to exchange station 1 based on the signals received from each of beacons A-D. The sensors on the 4-Runner may determine the location of the 4-Runner relative to each beacon based on the relative strength of the received signals. TCU 118, mobile device 130, network element 120 may guide the 4-Runner based on the instructions in the vendor mapping information and the signals received by beacons A-D, the guidance segments 308, and/or exchange stations 314a-314c. When the 4-Runner is parked at exchange station 1, the exchange station may detect the presence of the vehicle. Method 400 may proceed to block 470.

At block 470, the vehicle and the exchange station/mechanic may perform mutual authentication. One or more network-enabled computers at exchange station 1 may provide code_2 to the vehicle and/or mobile device 130. This may also be done by security module 208 (e.g., security module 208 may provide code_2 to mobile device 130 in response to receiving a confirmation signal from the vendor (mechanic) that the vehicle has arrived at the exchange station). The codes may be exchanged locally via bluetooth transmission signals. Similarly, the 4-Runner/mobile device and/or security module 208 may provide code_1 to the exchange station network-enabled computer (and/or another network-enabled computer associated with the mechanic). The vehicle/mobile device may perform the hash of the combination of code_1 and code_2 and determine whether it matches the hash received from security module 208. Mechanic network-enabled computer may do the same. If there is a match for both the vehicle and the mechanic, the mechanic may automatically deliver the repaired motor to the back of the 4-Runner (e.g., using a mechanic arm or lift). The 4-Runner may then leave the mechanic's lot and return to the user. At block 480, the vehicle/mobile device and/or mechanic may provide a confirmation signal to interface module 202, indicating that that the transaction has been completed.

Figure 5:
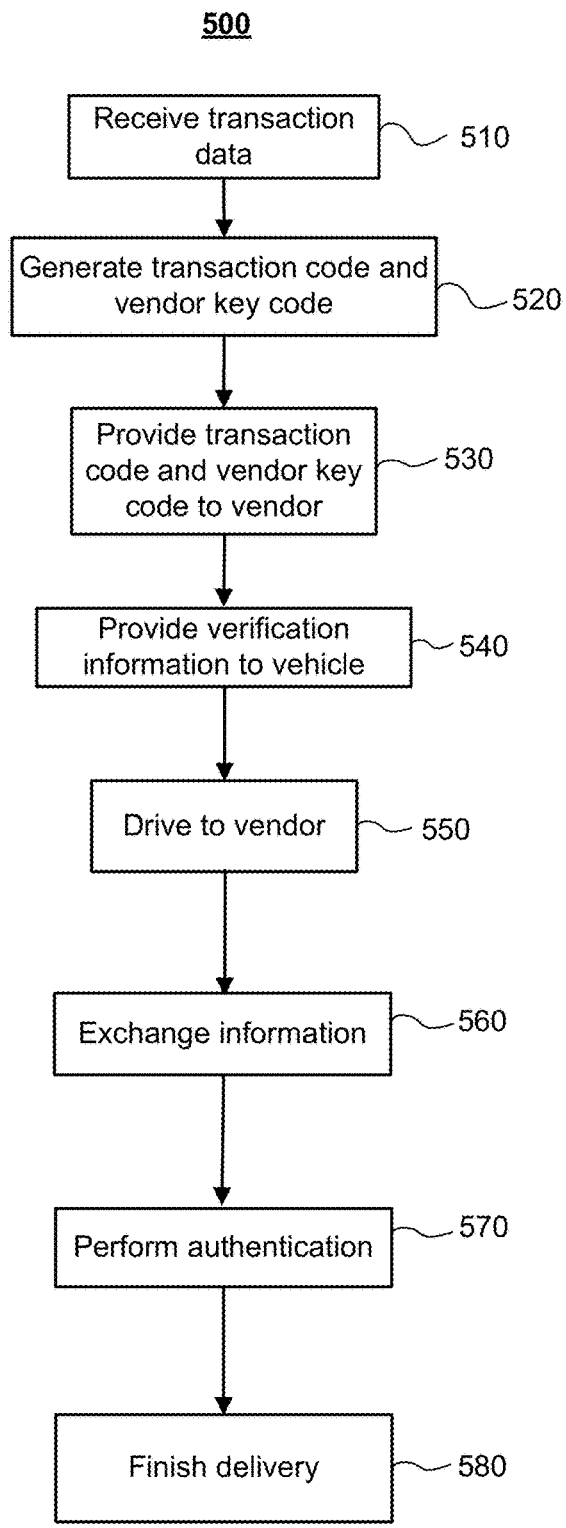
FIG. 5 depicts an illustrative flowchart of a method for facilitating a transaction and delivery using one or more autonomous vehicles, according to an exemplary embodiment.

Referring to FIG. 5, an illustrative flowchart of a method for facilitating a transaction and delivery using one or more autonomous vehicles. This exemplary method 500 is provided by way of example, as there are a variety of ways to carry out methods according to the present disclosure. The method 500 shown in FIG. 5 can be executed or otherwise performed by one or a combination of various systems and modules. The method 500 described below may be carried out by system 100 shown in FIG. 1 and delivery server 102 shown in FIG. 2, by way of example, and various elements of the system 100 and delivery server 102 are referenced in explaining the exemplary method of FIG. 5. Each block shown in FIG. 5 represents one or more processes, decisions, methods or subroutines carried out in exemplary method 500, and these processes, decisions, methods or subroutines are not necessarily carried out in the specific order outlined in FIG. 5, nor are each of them required. Referring to FIG. 5, exemplary method 500 may begin at block 510.

At block 510, input module 202 of delivery server 102 may receive transaction data from user 110 (e.g., via mobile device 130) and vendor 140. This may be similar to the process described in block 410 of FIG. 4. As part of the transaction, mobile device 130 may provide location data associated with vehicle 116 at time T0. The location data may be GPS coordinates. Method 500 may proceed to block 520.

At block 520, delivery server 102 may generate a transaction code and a vendor key code. The transaction code may comprise a first hash of the VIN for vehicle 116+the location data at time T0 (received in block 510). The vendor key code may comprise a second hash of the VIN+the time T0. The first hash and second hash may be identical hash functions. Method 500 may proceed to block 530.

At block 530, delivery server 102 may provide the transaction code and vendor key code to vendor 140. At block 540, delivery server 102 may also provide the transaction code, the pickup and delivery time, and the vendor location and the vendor mapping information to vehicle 116 and/or mobile device 130. Vehicle 116 may save the location information for the vehicle at time T0.

At block 550, vehicle 116 may drive to the vendor (using the vendor location information and/or the vendor mapping information). At block 560, vehicle 116 may arrive at the exchange station and provide the VIN for vehicle 116 and the location data from time T0 to vendor 140 (at an exchange station). This information may be provided over a short-range wireless transmission system, such as Bluetooth. Vendor 140 may then perform the first hash of the VIN+the location data from time T0 and compare it to the transaction code received from delivery server 102 in block 520. If there is a match, the vendor may provide the vendor key code to vehicle 116 and/or mobile device 130. At block 570, vehicle 116 may authenticate the vendor by performing the second hash of the VIN+time T0 and comparing it to the vendor key. If the validation is successful, the pickup/delivery will be completed at block 580 (e.g., vehicle 116 automatically unlocks or opens a door so that the goods can be picked up/delivered at the exchange station of vendor 140).

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at one or more computer processors associated with a vehicle, first information comprising a first security code, a hash of a combination of the first security code and a second security code, an address associated with a vendor, and mapping information associated with a vendor's location;
   navigating to the address associated with the vendor using the vehicle;
   receiving, from one or more transmitters at the vendor's location, one or more signals at one or more sensors associated with the vehicle;
   navigating to an exchange station associated with the vendor using the vehicle based in part on the one or more signals and the mapping information;
   receiving, over a network, a third security code at the one or more computer processors associated with the vehicle;
   providing the first security code, via the network, to a computer processor associated with the vendor;
   performing a hash of a combination of the first security code and the third security code;
   comparing the hash of the combination of the first security code and the second security code to the hash of the combination of the first security code and the third security code using the one or more computer processors associated with the vehicle; and
   opening a compartment in the vehicle if there is a match between the hash of the combination of the first security code and the second security code and the hash of the combination of the first security code and the third security code.

2. The method of claim 1, wherein the one or more computer processors associated with the vehicle are at least one of a mobile device, a telematics control unit on the vehicle, and a network-enabled computer on the vehicle.

3. The method of claim 1, wherein each of the one or more signals comprises a unique identifier, wherein the mapping information comprises information associating each unique identifier to a respective transmitter of the one or more transmitters, a relative location of each of the one or more transmitters, and a relative location of the exchange station.

4. The method of claim 3, wherein navigating to the exchange station comprises determining a distance between the vehicle and each of the one or more transmitters based on the received one or more signals, determining a location of the vehicle relative to each of the one or more transmitters and the exchange station based on the received one or more signals, and driving to the exchange station.

5. The method of claim 3, further comprising detecting, using a third sensor at the vehicle, a presence of at least one guidance segment at the vendor's location, wherein the mapping information further comprises location information associated with the at least one guidance segment.

6. The method of claim 5, wherein navigating to the exchange station comprises determining a location of the vehicle relative to the exchange station based on the presence of the at least one guidance segment, and driving to the exchange station.

7. The method of claim 1, wherein the one or more transmitters emit the one or more signals using Bluetooth Low Energy (BLE) transmissions.

8. The method of claim 5, wherein the at least one guidance segment comprises a series of infrared transmitters located on a surface of the vendor's location.

9. The method of claim 1, further comprising providing a VIN number associated with the vehicle to a security station at the vendor's location.

10. The method of claim 1, further comprising transmitting a confirmation signal over the network to a remote server if there is a match between the hash of the combination of the first security code and the second security code and the hash of the combination of the first security code and the third security code.

11. The method of claim 1, wherein the first information further comprises a scheduled date and time, wherein navigating to the address associated with the vendor using the vehicle further comprises navigating to the address associated with the vendor to arrive at the address at the scheduled date and time using the vehicle.

12. The method of claim 11, further comprising:
comparing a current date and time with the scheduled date and time; and
locking the compartment of the vehicle to prevent it from opening if a difference between the current date and time and the scheduled date and time is greater than a predetermined time range.

13. A method comprising:
receiving, over a network at one or more computer processors, transaction confirmation data indicating a transaction between a user and a vendor, wherein the user is associated with a vehicle and a user device;
generating, using the one or more computer processors, first information comprising a first security code, a second security code, and a hash of a combination of the first security code and the second security code;
generating, using the one or more computer processors, mapping information associated with the vendor based at least in part on a profile associated with the user, a profile associated with the vendor, and the vehicle;
retrieving, using the one or more computer processors, address information associated with the vendor;
providing, over the network, the first information and the vendor mapping information to at least one of the user device and the vehicle;
providing, over the network, the second security code and the hash to the vendor;
receiving, over the network, a signal from at least one of the vendor, the vehicle, and the user device indicating that the vehicle has arrived at an address, associated with the address information, associated with the vendor; and
providing, over the network, the second security code to the vehicle and the first security code to the vendor based on the received signal to facilitate delivery of goods between the user and the vendor.

14. The method of claim 13, wherein at least one of the first security code and the second security code are randomly generated.

15. The method of claim 13, wherein at least one of the first security code and the second security code are based on at least one of profile information associated with the user, and a VIN associated with the vehicle.

16. The method of claim 13, wherein the mapping information comprises information associated with a vendor's location, including a location of one or more transmitters at the vendor's location, a unique identifier associated with each of the one or more transmitters, a location of guidance segments at the vendor's location, and a location of one or more exchange stations at the vendor's location.

17. The method of claim 16, wherein the mapping information includes instructions for the vehicle to navigate to one of the one or more exchange stations based on at least one of a size of the vehicle, a make of the vehicle, and a model of the vehicle.

18. The method of claim 13, wherein the transaction includes a condition that the user at least one of pick up an item or drop off an item with the vendor.

19. The method of claim 13, wherein the first information further comprises a scheduled date and time.

20. A system, comprising:
a processor; and
a memory comprising computer-readable instructions which when executed by the processor cause the processor to:
receive, over a network at the processor, transaction confirmation data indicating a transaction between a user and a vendor, wherein the user is associated with a vehicle and a user device;
generate, using the processor, a first security code, a second security code, and a hash of a combination of the first security code and the second security code;
generate, using the processor, mapping information associated with the vendor based at least in part on a profile associated with the user, a profile associated with the vendor, and the vehicle;
retrieve, using the processor, address information associated with the vendor;
provide, over the network, the address information, the vendor mapping information, the first security code, and the hash to at least one of the user device and the vehicle;
provide, over the network, the second security code and the hash to the vendor;
receive, over the network, a signal from at least one of the vendor, the vehicle, and the user device indicating that the vehicle has arrived at an address, associated with the address information, associated with the vendor; and
provide, over the network, the second security code to the vehicle and the first security code to the vendor based on the received signal to facilitate delivery of goods between the user and the vendor.

* * * * *